(12) United States Patent
Zhou et al.

(10) Patent No.: US 7,579,725 B2
(45) Date of Patent: Aug. 25, 2009

(54) LIQUID COOLED ROTOR ASSEMBLY

(75) Inventors: Peng Zhou, El Cerrito, CA (US); Nicholas Robert Kalayjian, San Carlos, CA (US); Grant Dufresne Cutler, Altadena, CA (US); Peteris Koch Augenbergs, Foster City, CA (US)

(73) Assignee: Tesla Motors, Inc., San Carlos, CA (US)

( * ) Notice: Subject to any disclaimer, the term of this patent is extended or adjusted under 35 U.S.C. 154(b) by 0 days.

(21) Appl. No.: 12/317,301

(22) Filed: Dec. 20, 2008

(65) Prior Publication Data

US 2009/0121563 A1    May 14, 2009

Related U.S. Application Data

(62) Division of application No. 11/799,540, filed on May 1, 2007, now Pat. No. 7,489,057.

(51) Int. Cl.
*H02K 1/32* (2006.01)
*H02K 9/00* (2006.01)
*H02K 9/06* (2006.01)

(52) U.S. Cl. .................................... 310/61
(58) Field of Classification Search ............... 310/61, 310/52, 54; *H02K 9/19*
See application file for complete search history.

(56) References Cited

U.S. PATENT DOCUMENTS

| | | | |
|---|---|---|---|
| 5,589,720 A | 12/1996 | Berger |
| 6,191,511 B1 | 2/2001 | Zysset |
| 6,329,731 B1 | 12/2001 | Arbanas et al. |
| 6,626,649 B2 | 9/2003 | Cowans |
| 6,734,585 B2 | 5/2004 | Tornquist et al. |
| 7,009,317 B2 | 3/2006 | Cronin et al. |
| 7,042,121 B2 | 5/2006 | De Filippis et al. |
| 7,112,901 B1 | 9/2006 | Soitu |
| 7,156,195 B2 | 1/2007 | Yamagishi et al. |

*Primary Examiner*—Javaid Nasri
(74) *Attorney, Agent, or Firm*—Patent Law Office of David G. Beck

(57) ABSTRACT

A rotor assembly cooling system (100) and method of using same are provided. A portion of the rotor shaft (103) is hollow, the rotor shaft including an open end (107) and a closed end (105). A coolant feed tube (109) is rigidly attached to the rotor shaft (103) using one or more support members (111), thus causing the shaft and the feed tube to rotate at the same rate. Coolant is pumped through the feed tube until it exits the end of the feed tube and flows against the inside surface of the closed end of the rotor shaft causing the coolant to change direction and flow back through the coolant flow region, this region being defined as the space between the outer surface of the feed tube and the inner surface of the hollow rotor shaft.

9 Claims, 3 Drawing Sheets

LIQUID COOLED ROTOR ASSEMBLY

CROSS-REFERENCES TO RELATED APPLICATIONS

This application is a divisional of U.S. patent application Ser. No. 11/799,540, filed May 1, 2007, now U.S. Pat. No. 7,489,057 the disclosure of which is incorporated herein by reference for any and all purposes.

FIELD OF THE INVENTION

The present invention relates generally to electric vehicles and, more particularly, to a method and apparatus for efficiently cooling the rotor in the drive motor of an electric vehicle.

BACKGROUND OF THE INVENTION

Electric motors can generate considerable heat, thereby making motor cooling difficult, especially in the traction motor of a vehicle where size and weight constraints are coupled with the need for high output. Additionally, in order to avoid excessive wear due to differential thermal expansion, it is important to cool the internal motor components (e.g., rotor) as well as the outer motor components (e.g., casing, stator). Lastly, the means used to cool the motor must not be susceptible to large variations in the operating environment as such a motor can be expected to be subjected to a wide range of ambient temperatures, humidity levels and dust/dirt levels.

A number of different approaches have been taken to meeting the cooling demands placed on a vehicle's electric motor. For example, U.S. Pat. No. 6,191,511 discloses using a closed loop, liquid cooling circuit to try and achieve a temperature balance within the motor, the cooling circuit passing the coolant through both the stator and a hollow rotor shaft. Within the hollow rotor shaft is a stationary injection tube, the injection tube fixed to the stator flange. The coolant is pumped through the injection tube to the end of the rotor shaft where it is driven back between the injection tube and the hollow rotor. The coolant then passes through a cylindrical cooling chamber extending over the length and periphery of the stator before cooling the stator structure and being returned to the injection tube.

U.S. Pat. No. 6,329,731 discloses a liquid cooled electric motor in which one of the main elements of the planetary gear drives the displacement pump of the cooling circuit. The coolant is driven through a stationary tube about which the hollow rotor shaft rotates. The coolant then passes between the stationary tube and the hollow rotor shaft before passing through a radiator incorporated into the motor and planetary gear casing.

U.S. Pat. No. 7,156,195 discloses an electric motor in which the liquid coolant is collected within the reduction gear case, not the motor case, thus avoiding deterioration and alteration of the motor magnets. The coolant from the reservoir is pumped through the end of a passage in the drive shaft where it flows toward the motor. Part of the coolant is sprayed onto the reduction gears while the rest of the coolant is pumped between the drive shaft and the reduction gear shaft and the motor output shaft.

The present invention provides an improved rotor assembly cooling system.

SUMMARY OF THE INVENTION

The present invention provides a rotor assembly cooling system and method of using same. A portion of the rotor shaft is hollow, the rotor shaft including an open end and a closed end. A coolant feed tube is rigidly attached to the rotor shaft, the feed tube being mounted within the hollow portion of the rotor shaft, thus causing the shaft and the feed tube to rotate at the same rate. Coolant is pumped through the feed tube until it exits the end of the feed tube and flows against the inside surface of the closed end of the rotor shaft causing the coolant to change direction and flow back through the coolant flow region, this region being defined as the space between the outer surface of the feed tube and the inner surface of the hollow rotor shaft.

One or more support members rigidly attach the feed tube to the inside surface of the hollowed out portion of the rotor shaft. In at least one embodiment, a plurality of support members is used in which each of the support members is comprised of a plurality of spokes. In at least one alternate embodiment, a plurality of support members is used in which each of the support members is comprised of a an inner ring attached to the outer surface of the feed tube, an outer ring attached to the inside surface of the rotor shaft, and a plurality of spokes coupling the two rings together. In at least one other alternate embodiment, a plurality of support members is used in which each of the support members is comprised of a ring, wherein the inner surface of each ring is attached to the outer surface of the feed tube, the outer surface of each ring is attached to the inside surface of the rotor shaft, and wherein each ring includes a plurality of holes or slots passing from one side of the ring to the other side of the ring. The holes or slots are either direct or slanted. In at least one other alternate embodiment, the support member is a continuous support strut that is helically wrapped around and attached to the outer surface of the coolant feed tube, wherein an outer edge of the support structure is proximate to and attached to the inner surface of the rotor shaft.

In at least one embodiment of the invention, the inner surface of the closed end of the rotor shaft is shaped, thereby promoting the directional change of the coolant from a first direction through the feed tube to a second direction through the coolant flow region between the outer surface of the feed tube and the inner surface of the rotor shaft.

A further understanding of the nature and advantages of the present invention may be realized by reference to the remaining portions of the specification and the drawings.

DESCRIPTION OF THE SPECIFIC EMBODIMENTS

Figure 1:
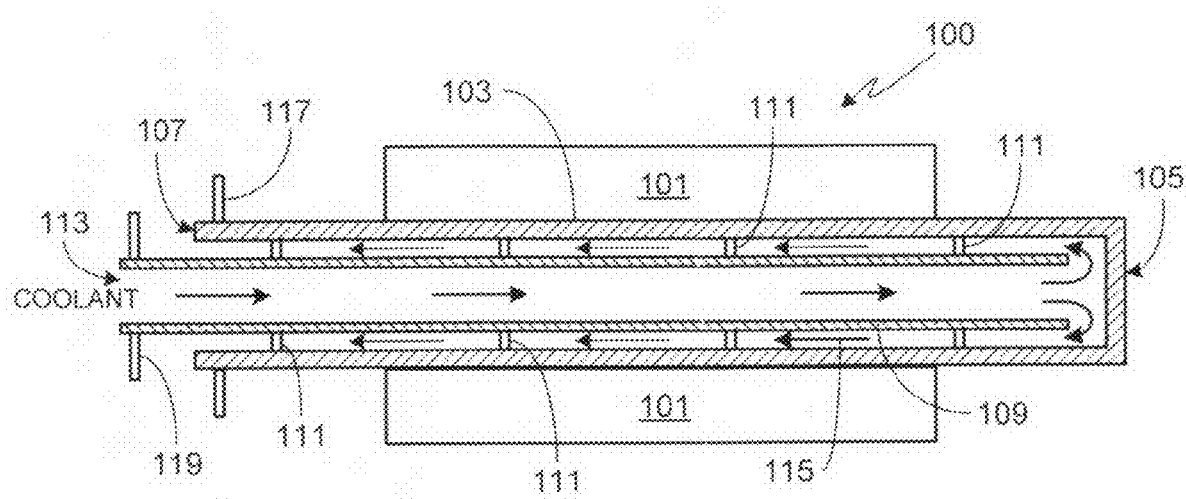
FIG. 1 is a schematic illustration of the primary components of the rotor assembly cooling system.

FIG. 1 schematically illustrates the primary components of the rotor assembly cooling system of the invention. Rotor assembly 100 includes a rotor 101 fixed to a rotor drive shaft 103. Drive shaft 103 is hollow and closed at end 105 and open at end 107. Although not a requirement of the invention, preferably shaft 103 is hollow over the majority of its length, including that portion of the shaft in contact with rotor 101, thereby insuring efficient cooling of the rotor assembly. A hollow coolant feed tube 109 is rigidly attached to shaft 103 with at least one, and preferably a plurality of support members 111.

During operation, coolant is pumped into end 113 of feed tube 109. The coolant flows through the length of feed tube 109 until it is redirected by the inside surface of closed end 105 of shaft 103. The coolant than flows back along direction 115 towards the inlet, passing within the coolant flow region between the outer surface of feed tube 109 and the inside surface of shaft 103 thereby cooling the drive shaft and the attached rotor.

As both shaft 103 and feed tube 109 rotate, the assembly requires at least one coolant seal 117 to seal rotating shaft 103, and at least a second coolant seal 119 to seal rotating feed tube 109. It will be appreciated that seal 117 is more critical than seal 119 as coolant leaked from seal 119 will simply re-enter the coolant reservoir.

Figure 2:
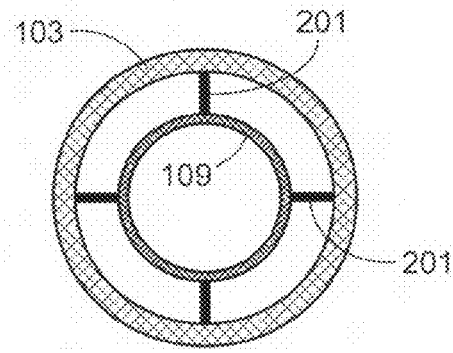
FIG. 2 is a cross-sectional view of one embodiment of a feed tube support member utilizing a plurality of support spokes.
Figure 3:
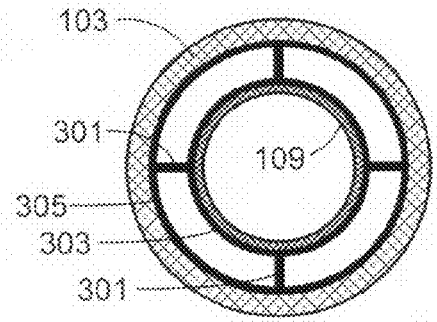
FIG. 3 is a cross-sectional view of an alternate embodiment of a feed tube support member utilizing a plurality of support spokes coupled to a pair of concentric mounting rings.

Support members 111 can take any of a variety of forms, a few of which are shown in the cross-sectional views of FIGS. 2-6. The support member shown in FIG. 2 is comprised of a plurality of spokes 201 that rigidly couple feed tube 109 to shaft 103. The support member shown in FIG. 3 also includes a plurality of spokes 301, however in this support member the spokes are coupled to a pair of concentric rings 303 and 305 which are rigidly coupled to feed tube 109 and shaft 103, respectively. Although the members shown in FIGS. 2 and 3 both utilize spokes, the member shown in FIG. 3 is generally easier to fabricate than the member shown in FIG. 2. It will be appreciated that a fewer or a greater number of spokes can be used with either of the support members shown in FIGS. 2 and 3.

Figure 4:
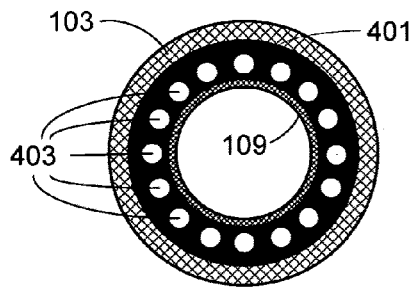
FIG. 4 is a cross-sectional view of a perforated feed tube support member.

FIG. 4 shows another alternate embodiment of the support member. In particular, member 401 is a ring-shaped member which includes a plurality of perforations 403 that provide the necessary coolant path. Member 401 can utilize fewer or greater numbers of perforations, different size perforations or perforations of varying size within a single member.

Figure 5:
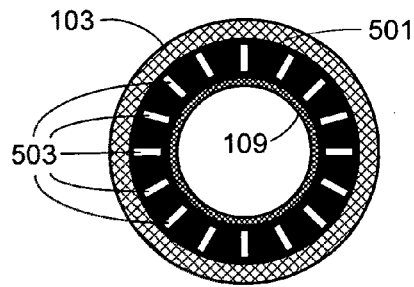
FIG. 5 is a cross-sectional view of a slotted feed tube support member.

FIG. 5 shows another alternate embodiment of the support member. As shown, member 501 includes a plurality of slotted openings 503. Preferably openings 503 are angled, thus allowing members 501 to provide an additional means for pumping the coolant as it passes through the region between feed tube 109 and shaft 103. Although member 501 is shown with slanted slots, it should be understood that other shapes can be used in the slanted openings, for example slanted perforations. Additionally, member 501 can utilize fewer or greater numbers of openings than shown.

Figure 6:
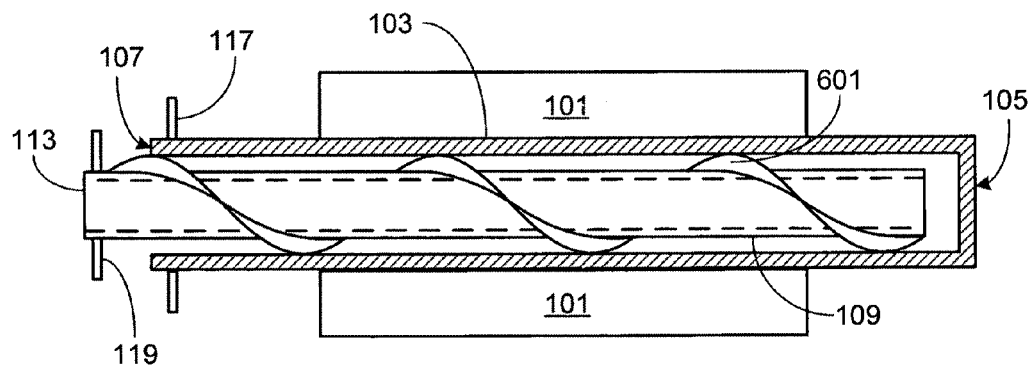
FIG. 6 is an illustration of an alternate rotor assembly cooling system using a helical support strut between the coolant feed tube and the bore of the rotor drive shaft.

In addition to using a plurality of support members to couple feed tube 109 to shaft 103, in at least one embodiment of the invention a continuous support member 601 is used, as illustrated in FIG. 6. As shown, member 601 is comprised of a continuous support strut which helically wraps around feed tube 109 and couples it to shaft 103. Due to the helical shape of member 601, coolant is actively pumped in the region separating feed tube 109 from shaft 103, thus insuring continuous coolant flow to the rotor assembly.

Figure 7:
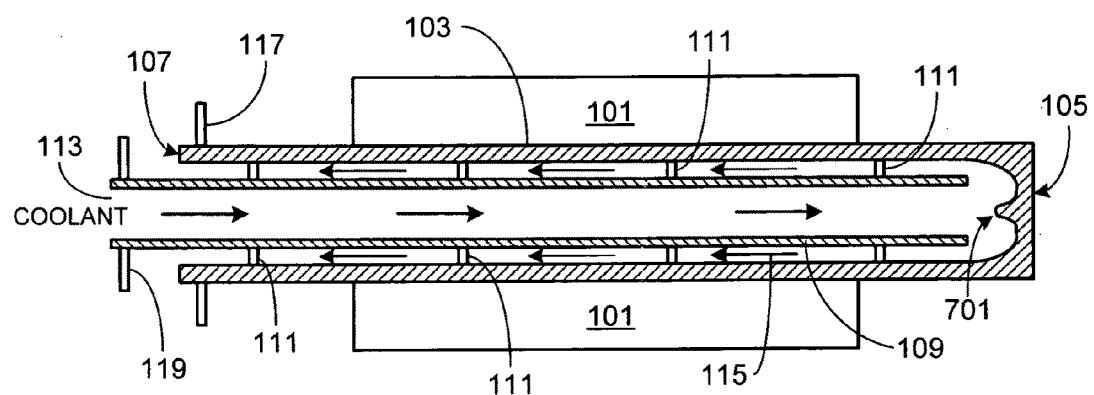
FIG. 7 is an illustration of an alternate rotor assembly cooling system using an internally shaped drive shaft.

In order to improve coolant flow when the coolant undergoes the directional change at the end of feed tube 109, adjacent to end 105 of feed tube 103, preferably the inside surface 701 of the end of feed tube 103 is shaped, for example as illustrated in FIG. 7. Shaping surface 701 promotes coolant flow and reduces flow stagnation. It will be appreciated that shaping surface 701 aids coolant flow regardless of the configuration used for the support member.

Figure 8:
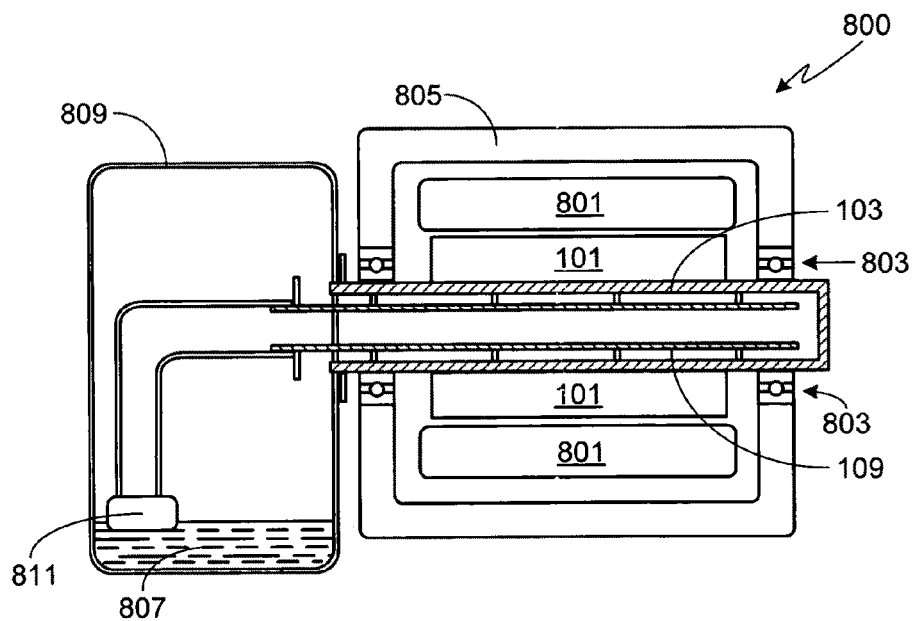
FIG. 8 is a conceptual illustration of the rotor assembly cooling system within an electric motor system.

It should be understood that an electric motor utilizing the rotor assembly cooling system of the present invention is not limited to a specific implementation. FIG. 8 conceptually illustrates the basic elements of an electric motor utilizing the present invention. It will be appreciated that FIG. 8, as with the other figures included herein, is not drawn to scale.

The other elements of electric motor 800 are the same as in a conventional electric motor. For example, motor 800 includes a stator 801, drive shaft bearings 803 and motor case 805. The rotor cooling assembly, in addition to the other elements previously described in detail, also includes a coolant reservoir 807 within a housing 809 and a coolant pump 811. In at least one embodiment, housing 809 also contains the transmission thus allowing the coolant to also be used to cool and lubricate the transmission. In at least one alternate embodiment, housing 809 is a separate housing used only for coolant containment and circulation, thus requiring the other end of the drive shaft to be coupled to the power train of the vehicle. It will be appreciated that the rotor cooling assembly of the invention can be used in conjunction with other cooling systems, for example a coolant system integrated into the motor housing.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of cooling an electric motor in an electric vehicle, said method comprising the steps of:

rotating a rotor shaft of the electric motor at a shaft rotation rate, said rotor shaft comprised of an open end located at a first end of said rotor shaft and along a rotor shaft centerline defined by a long axis of said rotor shaft, a closed end located at a second end of said rotor shaft and along said rotor shaft centerline, and a hollow portion between said open end and said closed end and located coaxially along said rotor shaft centerline;

rotating a coolant feed tube extending through said open end of said rotor shaft and positioned within said hollow portion of said rotor shaft at a tube rotation rate, wherein said tube rotation rate is equivalent to said shaft rotation rate, wherein said coolant feed tube is rigidly coupled to said rotor shaft, and wherein said coolant feed tube is comprised of a coolant inlet located at a first end of said coolant feed tube and along a coolant feed tube centerline defined by a long axis of said coolant feed tube, a coolant outlet located at a second end of said coolant feed tube and along said coolant feed tube centerline, and a hollow portion therebetween defining a first coolant flow path, wherein said coolant outlet of said coolant feed tube is proximate to and spaced apart from said closed end of said rotor shaft, wherein a separation between an outer, lengthwise surface of said coolant feed tube and an inner, lengthwise surface of said hollow portion of said rotor shaft defines a second coolant flow path; and pumping a coolant through said coolant inlet, through said first coolant flow path, out of said coolant outlet, through said second coolant flow path, and through said open end of said rotor shaft.

2. The method of claim 1, wherein said step of pumping said coolant through said coolant inlet, through said first coolant flow path, out of said coolant outlet, through said second coolant flow path and through said open end of said rotor shaft further comprises the steps of pumping said coolant through said first coolant flow path in a first direction and pumping said coolant through said second coolant flow path in a second direction, wherein said first direction is opposite said second direction.

3. The method of claim 2, further comprising the step of redirecting said coolant from said first direction to said second direction, said redirecting step further comprising the step of pumping said coolant against an inner surface of said closed end of said rotor shaft.

4. The method of claim 1, further comprising the step of rigidly coupling said coolant feed tube to said hollow portion of said rotor shaft with a plurality of support members.

5. The method of claim 1, further comprising the step of rigidly coupling said coolant feed tube to said hollow portion of said rotor shaft with a plurality of spokes.

6. The method of claim 1, further comprising the step of rigidly coupling said coolant feed tube to said hollow portion of said rotor shaft with a plurality of ringed members, wherein each ringed member is comprised of a first ring proximate to and attached to said outer surface of said coolant feed tube, a second ring proximate to and attached to said inner surface of said hollow portion of said rotor shaft, and a plurality of spokes rigidly coupling said first ring to said second ring.

7. The method of claim 1, further comprising the step of rigidly coupling said coolant feed tube to said hollow portion of said rotor shaft with a plurality of ringed members, wherein an inner edge of each ringed member is proximate to and attached to said outer surface of said coolant feed tube and wherein an outer edge of each ringed member is proximate to and attached to said inner surface of said hollow portion of said rotor shaft, and wherein each ringed member is further comprised of a plurality of holes passing from a first side of said ringed member to a second side of said ringed member.

8. The method of claim 1, further comprising the step of rigidly coupling said coolant feed tube to said hollow portion of said rotor shaft with a plurality of ringed members, wherein an inner edge of each ringed member is proximate to and attached to said outer surface of said coolant feed tube and wherein an outer edge of each ringed member is proximate to and attached to said inner surface of said hollow portion of said rotor shaft, and wherein each ringed member is further comprised of a plurality of slots passing from a first side of said ringed member to a second side of said ringed member.

9. The method of claim 1, further comprising the step of rigidly coupling said coolant feed tube to said hollow portion of said rotor shaft with a continuous support strut helically wrapped around said coolant feed tube.

* * * * *